United States Patent

[11] 3,609,565

[72] Inventor Robert W. Arnold
Hopewell, Va.
[21] Appl. No. 888,581
[22] Filed Dec. 29, 1969
[45] Patented Sept. 28, 1971
[73] Assignee International Business Machines Corporation
Armonk, N.Y.

[54] EXTREME LEVEL DETECTOR
10 Claims, 3 Drawing Figs.

[52] U.S. Cl. ........ 328/147, 307/235, 328/117, 328/137, 328/148, 328/154
[51] Int. Cl. ........ H03k 5/20
[50] Field of Search ........ 307/235, 236, 243; 328/71, 95, 96, 97, 104, 116, 117, 137, 146, 147, 148, 154

[56] References Cited

UNITED STATES PATENTS

| | | | |
|---|---|---|---|
| 2,974,286 | 3/1961 | Meyer | 328/116 |
| 3,031,142 | 4/1962 | Cohen et al. | 328/137 X |
| 3,092,732 | 6/1963 | Milford | 307/235 |
| 3,228,002 | 1/1966 | Reines | 307/235 |
| 3,237,025 | 2/1966 | Clapper | 307/235 X |
| 3,409,830 | 11/1968 | Phillips, Jr. | 328/116 X |
| 3,471,714 | 10/1969 | Gugliotti, Jr. et al. | 307/230 |

*Primary Examiner*—Donald D. Forrer
*Assistant Examiner*—L. N. Anagnos
*Attorneys*—Hanifin and Jancin and Carl W. Laumann, Jr.

ABSTRACT: A system for identifying and selecting the maximum or minimum value signal from among a plurality of signals. The system includes an amplifier for each input signal. The outputs of the amplifiers are connected to a common load through individual diodes. A negative feedback connection is provided from the load to an amplifier input. The polarity of the voltage drop across the diodes is monitored to determine the diode which is forward biased. This indicates the amplifier with the extreme valued input signal. A second set of diodes across the amplifiers limits the output voltage to reduce overload conditions.

PATENTED SEP 28 1971

3,609,565

*INVENTOR.*
ROBERT W. ARNOLD

*BY* [signature]
*ATTORNEY*

EXTREME LEVEL DETECTOR

BACKGROUND OF THE INVENTION

In systems relating to the processing of analog signals, it is sometimes necessary to identify the source of the largest or smallest signal and transmit this signal for further processing. An example of systems which require such circuits are those directed to character recognition. A wide variety of circuits exists for performing this type of function. However, some of those which identify the largest signal have no provision for transmitting the same signal for further processing. Similarly, there are circuits which gate the largest signal but do not operate to identify the source of the largest signal. In still other circuits, there is an opportunity for error since the largest signal must exceed the next largest by a substantial factor, say 10 percent, in order to distinguish between them. The circuits usually require high gain sensitivity in order to distinguish between closely related signals. This makes them susceptible to overload with the attendant recovery problems which limit the speed of the systems. In some situations, there is an advantage in being able to compare various combinations of signals. Where this is a requirement, the circuits should be able to accommodate a plurality of inputs to each comparator.

SUMMARY OF THE INVENTION

The preferred embodiment of the invention is a high resolution comparator for a plurality of analog signals. The comparator serves to select the gate the extreme valued analog signal, and at the same time, provide a digital signal identifying the analog source which has been gated.

A number of differential amplifiers have their outputs connected to a common load through individual diodes. Each differential amplifier has two input terminals. Signals applied to a first input terminal are amplified and appear in the inverted form at the output. Signals applied to the second input terminal are also amplified but appear at the output in noninverted form.

The analog input signals to be classified are connected to the second input terminals. The inverting input terminals are connected to be supplied with the signal developed at the common load. Each amplifier then becomes an operational amplifier with the output a function of the individual analog input signals and the feedback signal representing the signal at the common load. Since the signal at the load will represent the largest analog input signal, all others being smaller and therefore hidden, only one amplifier will have an output representing the analog signal applied to the noninverting input terminal. All the other amplifiers will be driven towards cutoff. As a result, only one amplifier will be delivering current to the load. All other diodes connecting to the load will be reverse biased.

A digital output, representing the amplifier which is still delivering current to the load, is provided by sensing the status of each connecting diode to determine the polarity of the voltage across it.

It is therefore an object of the invention to provide an improved signal classifying circuit.

It is another object of the invention to provide a signal classifying circuit which selects and gates only the extreme analog signal and provides a digital output indicating the source of the extreme signal.

Still another object of the invention is to provide a signal classifying circuit which has improved resolution and the capability of handling a large number of input signals.

An additional object of the invention is to provide a signal classifying circuit incorporating operational amplifiers which have fast recovery characteristics.

A still further object of the invention is to provide a multiinput signal classifying circuit which can accommodate combinations of analog input signals at each input to the classifying circuit.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
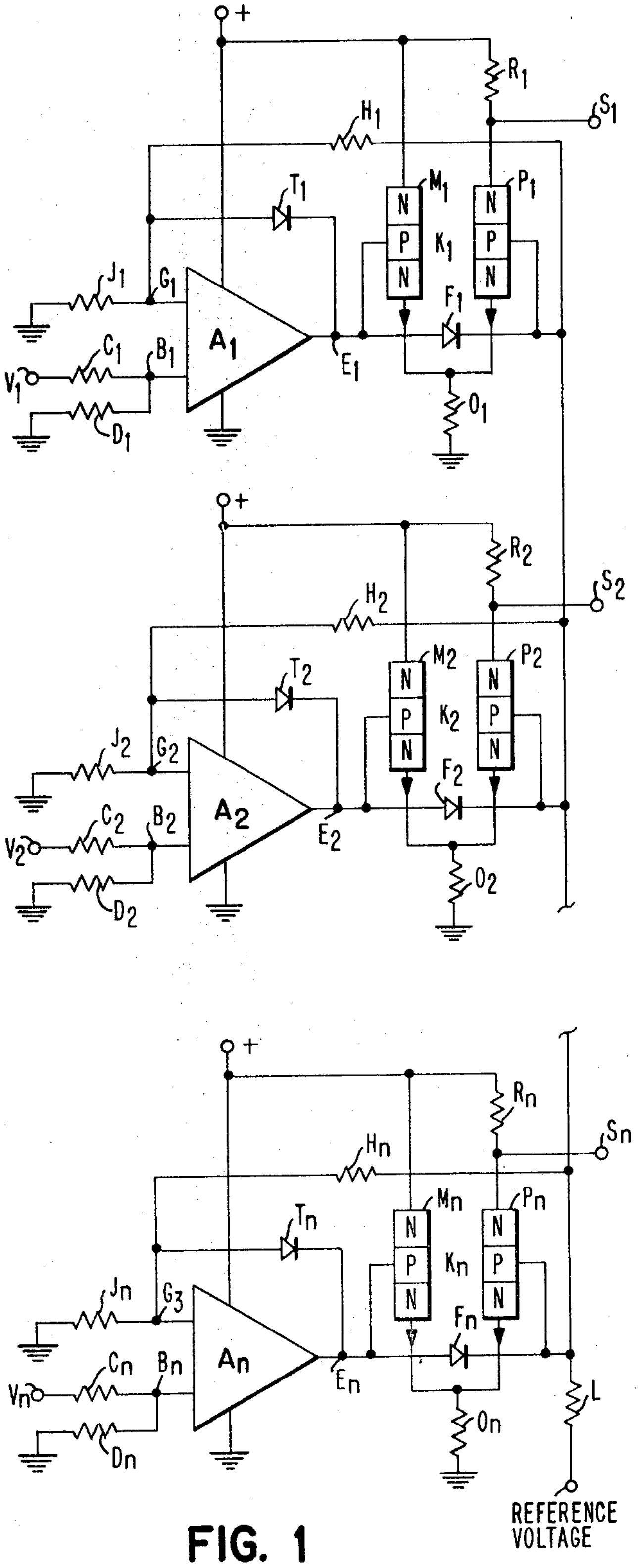
FIG. 1 is a schematic drawing of a system configuration of one embodiment of the invention.

In the system shown in FIG. 1, the analog signals $V_1$–$V_n$ to be compared are applied to the amplifiers $A_1$–$A_n$ at the noninverting input terminals $B_1$–$B_n$. Each of the noninverting inputs $B_1$–$B_n$ has a pair of resistors $C_1$–$C_n$and $D_1$–$D_n$ for the purpose of scaling the analog signals and terminating the input to ground, respectively.

The amplified output signals appear at terminals $E_1$–$E_n$. A diode $F_1$–$F_n$ connects output terminals $E_1$–$E_n$ to a load such as resistor L. The signal across load L is fed back to the inverting inputs $G_1$–$G_n$ through resistors $H_1$–$H_n$ and $J_1$–$J_n$. This negative feedback loop stabilizers the amplifier gain at a figure determined by the ratio of resistor H to resistor J.

Ignoring for the moment the effect of the commoned output signals, each amplifier would operate to provide an output signal at terminals E which is an amplified version of the signal applied to terminals B. Each amplifier has the same gain, as determined by the ratio of resistors H and J in accordance with conventional theory governing operational amplifiers. In the case where the gain of the amplifier is equal from both inputs B and G but opposite in sign, it can be seen that the amplifier will tend to operate at a point where the signals at inputs B and G are the same magnitude. If the signal at noninverting input terminal B increases, there is an increase in the value at output terminal E sufficient to increase the value at inverting, or negative feedback, terminal G an amount equivalent to the original increase at terminal B.

If for some reason such as a change in loading, the output voltage at terminal E should increase, the resulting increase in the signal at negative feedback terminal G causes the output voltage to be reduced until the inputs at the terminals B and G are again balanced.

The foregoing discussion of the relationship between the signals at terminals B, E and G is illustrative only of the situation where there is no common output connection. Since the system shown in in FIG. 1 has a common output connection of all amplifiers through diodes $F_1$–$F_n$ to load resistor L, the circuit operation is modified.

The effect of the common output terminals is to provide an output signal at load L which is representative of the largest signal of $V_1$–$V_n$. Negative feedback is provided from the common load to each inverting input terminal $V_1$–$V_n$. In the case of the amplifier having the largest input signal at terminal B, the amplifier will operate in the usual linear fashion. However, in the case of all the other amplifiers, the operation will be drastically altered. This is due to the fact that the feedback signal, instead of reflecting a signal representing the true output of the amplifier, represents a signal larger than the true output of the amplifier. This being the case, the feedback signal has the effect of reducing the output of the amplifiers below the point where it reflects that value at the noninverting input terminal. The unbalanced state between the inverting and noninverting inputs leads to reduced output from all amplifiers except the one energized by the maximum input signal.

In this situation, there will be only one of the diodes $F_1$–$H_n$ which will be forward biased. The forward biased diode is the one which is associated with the amplifier having the extreme valued input signal at terminal B, for example, amplifier $A_2$. In the case of the other amplifiers, the original output signal at terminals E was smaller than the output signal from amplifier $A_2$. The diodes connecting the other amplifiers to the load would therefore tend to be reverse biased, since the voltage at the load is greater than the other output voltages.

The feedback connection form load L to the inverting input terminals G further increases the back bias on the diodes associated with the other amplifiers. This is because the feedback signal at terminals G will be larger than the signals at terminals B at every amplifier except $A_2$. The presence of this larger signal at terminals G reduces the output voltage at terminals E of the other amplifiers to increase the back bias across their connecting diodes.

Detection of the forward-biased diode is accomplished by the differential amplifier stages $K_1$–$K_n$. Each stage has a pair of transistors $M_1$–$M_n$ and $P_1$–$P_n$. The bases of these transistor pairs are connected to opposite sides of diodes $F_1$–$F_n$. Because the emitters are connected to common coupling resistors $O_1$–$O_n$, transistors P will conduct current through output resistors $R_1$–$R_n$ when the base of P is more positive than the base of M, e.g., when the diode F is back biased.

In the other case where diode F is forward biased by current flowing from the amplifier A to the load L, the base of transistor M will be more positive than the base of transistor P and no current will flow through load resistor R.

From this discussion, it can be seen that the voltage at digital output terminals $S_1$–$S_n$ will be determined by the polarity of the voltage across the associated diode $F_1$–$F_n$. The voltage at terminal S will be essentially the same as the positive supply voltage when the diode is forward biased, and therefore conducting, to place the base of transistor P at a cutoff potential. When the diode is reverse biased, the base of transistor P is more positive than the base of M. The resulting conduction through transistor P reduces the voltage at terminal S to a value lower than the supply voltage.

By proper selection of the component values for the differential stages $K_1$–$K_n$, the forward bias drop across diode F can be made to saturate transistor P and provide an essentially two valued signal at terminal S. This signal is therefore digital in nature and can be processed with conventional digital logic circuits. The signal at terminal S associated with the amplifier having the extreme valued signal will be a high positive voltage. The signal at all the other terminals S will be a lower voltage.

The use of diodes $F_1$–$F_n$is desirable because they have a relatively fixed voltage drop when they are forward biased. Thus the voltage at load L is an accurate representation of the extreme signal at terminals $E_1$–$E_n$ minus the fixed voltage drop. In those cases where it is not necessary to use the voltage across load L for another purpose, the circuit would be operative with resistors substituted for diodes $F_1$–$F_n$. Other current sensing means could be used as well.

In some applications there will be an extremely wide range of input signals $V_1$–$V_n$ applied to the system. This leads to a corresponding wide range between the voltages applied to input terminals B and G of the amplifier having the minimum signal at terminal B. An overload condition could easily result which requires substantial recovery time when the next set of signals is applied. The purpose of diodes $T_1$–$T_n$ is to limit the maximum voltage difference between terminals G and E to one diode drop. Most amplifiers can quickly recover from an overload of this magnitude.

In the case where amplifiers $A_1$–$A_n$ can recover from an extreme overload fast enough to satisfy system requirements, diodes $T_1$–$T_n$ may not be required.

It will also be understood that while a single input voltage $V_1$–$V_n$ is shown as applied to input terminals $B_1$–$B_n$, it is also possible to apply multiple input voltages to terminals $B_1$–$B_n$ so that various combinations of voltages can be classified.

Figure 2:
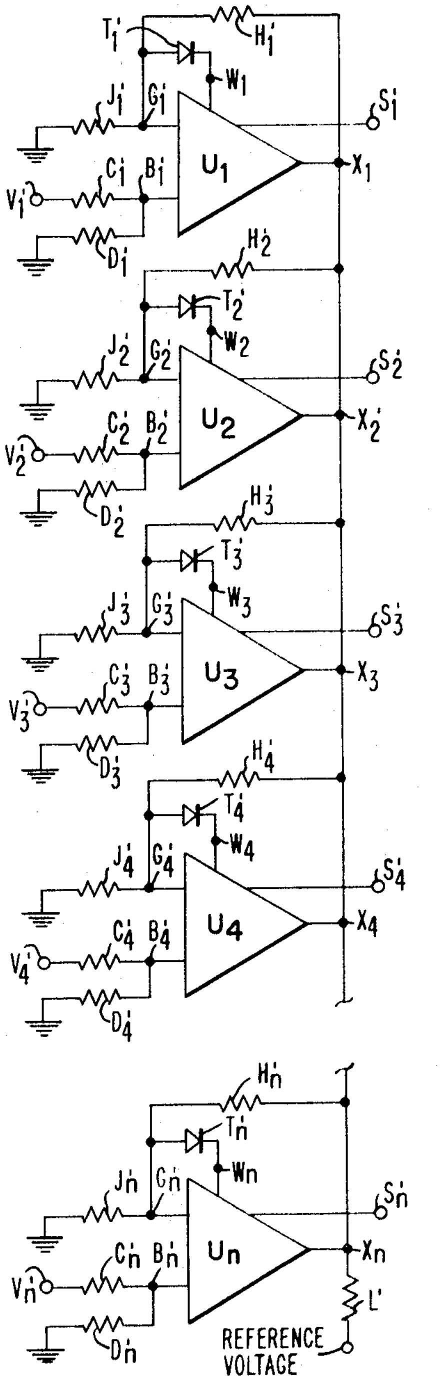
FIG. 2 is a schematic drawing of a system configuration of an alternative embodiment.

The system shown in FIG. 2 is an embodiment of the invention which uses a different amplifier than that of FIG. 1. The components indicated with the primed reference characters operate in precisely the same fashion as the corresponding components in FIG. 1. However, the circuit of FIG. 1 is designed to use monolithic amplifiers which have no provision for making internal connections.

In general, operation of the system of FIG. 2 is identical to that of FIG. 1. Analog voltages $V'_1$–$V'_n$ to be compared and classified are applied to noninverting inputs B'. The selected analog input voltage, representing the extreme value of the signals $V_1$–$V_n$, appears at the load L'. A digital output signal, representing the particular amplifier having the extreme valued signal applied to its input, is developed at the associated terminal S'. Diode $T'_1$–$T'_n$ limit the output voltage of the amplifier in the same fashion as diodes $T_1$–$T_n$.

Figure 3:
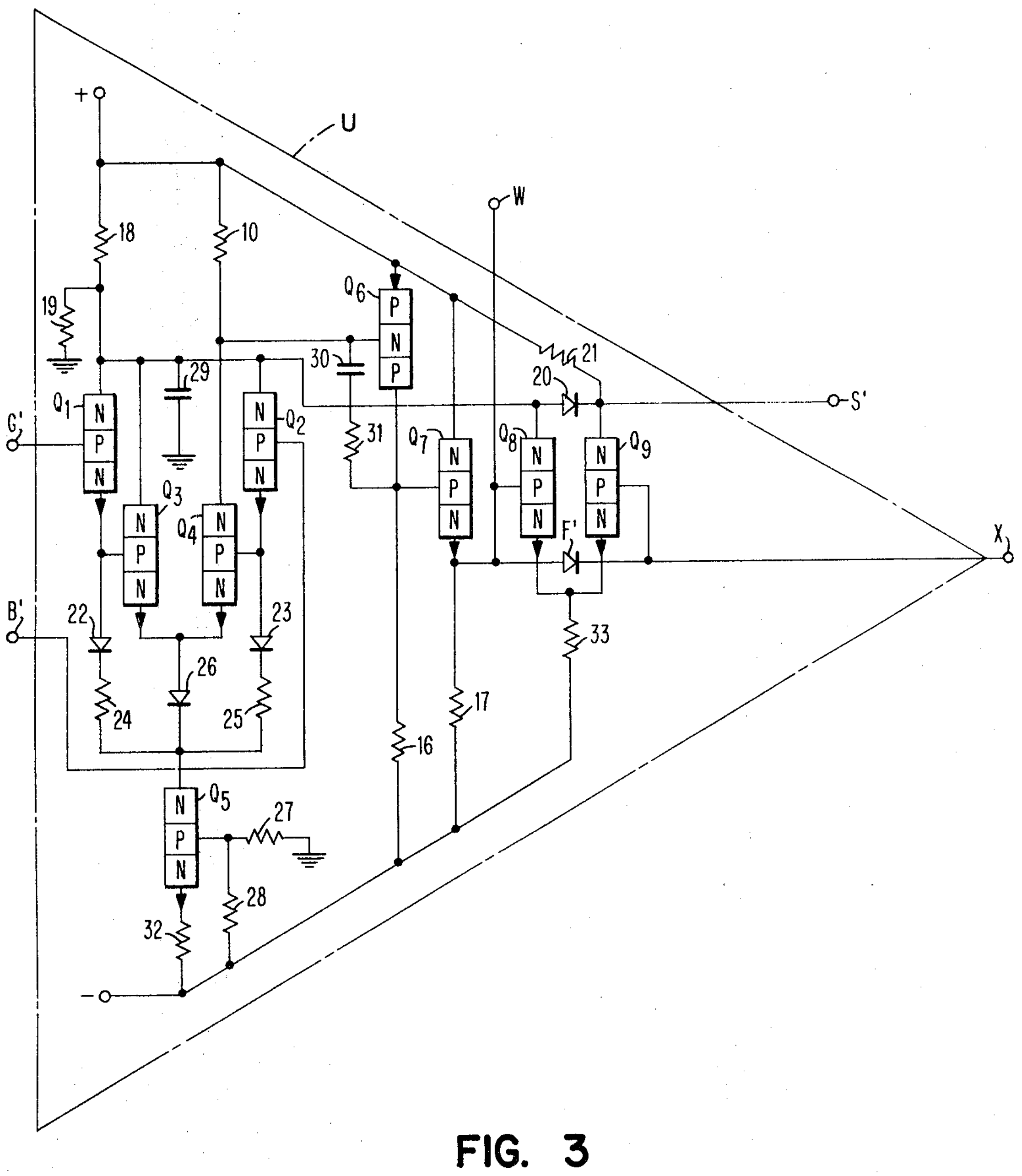
FIG. 3 is a detailed schematic drawing of an amplifier-comparator circuit for use in the system of FIG. 2.

The circuit of FIG. 3 is an amplifier-detector circuit for selecting the maximum signal applied to the inputs $B'_1$–$B'_n$ as shown in FIG. 2. This circuit includes a conventional differential amplifier stage made up of transistors $Q_1$–$_{Q7}$. Transistors $Q_1$ and $Q_2$ have their bases connected to inverting input terminal G' and noninverting input terminal B', respectively. Transistor pairs $Q_1$, $Q_3$ and $Q_2$, $Q_4$ are connected in a compound configuration. Transistor $Q_5$ operates as a current source to the amplifier. The output signal is developed across resistor 10. The signal across resistor 10 is applied to the base of transistor $Q_6$ which has a collector load resistor 16.

The signal across resistor 16 is applied to the base of transistor $q_7$, which functions as an output stage for the amplifier by developing a signal across load resistor 17. The negative feedback connection to inverting input G' is made from terminal W, which is supplied with the output signal developed across load resistor 17.

Diode F' connects the signal developed across load resistor 17 to output terminal X. As can be seen in FIG. 2, the output terminals $X_1$–$X_n$ are connected to a common load L'. This connection provides the same result as the corresponding connection in FIG. 1 and only that diode F' associated with the amplifier having the extreme valued input will be forward biased.

The primary difference between the circuit of FIG. 1 and that of FIG. 3 is the manner in which the collector of transistor $Q_8$ is supplied with voltage. This collector is directly connected to a voltage divider made up of resistors 18 and 19. These resistors are relatively low impedance to provide a stable voltage to the collectors of transistors $Q_1$, $Q_2$, $Q_3$ and $Q_8$.

Since this is a fairly stable voltage source, it is possible to prevent the digital output line from an extreme excursion by connecting a diode 20 between the collectors of transistors $Q_8$ and $Q_9$. In the case where diode F' is reverse biased, making the base of transistor $Q_9$ positive with respect to the base of transistor $Q_8$, transistor $Q_9$ will draw a variable amount of current depending on the magnitude of the bias voltage. This variable current would in turn develop a variable output voltage at terminal S' if the voltage were dependent only on the current through resistor 21.

In a digital circuit it is desirable to control the input voltages as accurately as possible. This could be done by adding extra stages of amplification to the circuit which senses the voltage across diode F' to assure that even the minimum reverse bias voltage causes the digital output transistor ($Q_9$) to saturate. The same accurate digital output voltage is provided by connecting the diode 20 to limit the minimum voltage level at the collector of transistor $Q_9$ to a value representing one diode drop below the value established at the junction of resistors 18 and 19.

Even though transistor $Q_9$ draws a variable amount of current, which would otherwise produce a variable drop across collector load resistor 21, the voltage at terminal S' cannot go more than one diode drop below the voltage at the junction of resistors 18 and 19.

The other portions of the circuits in FIG. 2 and FIG. 3 function in conventional fashion. Diodes 22 and 23 serve to provide DC bias temperature compensation. Resistors 24 and 25 are emitter load resistors for transistors $Q_1$ and $Q_2$. Diode 26 provides DC bias temperature compensation. Resistor 27 and 28 bias the base of transistor $Q_5$. Capacitor 29 is a filter capacitor. Capacitor 30 and resistor 31 are connected at the base of transistor $Q_6$ to provide the phase shift necessary to stabilize the amplifier. Resistor 32 reduces the temperature sensitivity of the circuit. Resistor 33 is an emitter load resistor for transistors $Q_8$ and $Q_9$.

While the invention has been particularly shown and described with reference to preferred embodiments thereof, it will be understood by those skilled in the art that the foregoing and other changes in form and details may be made therein without departing form the spirit and scope of the invention.

I claim:

1. A system for identifying the extreme value from among a plurality of input signals comprising,
a plurality of amplifiers each having
an output terminal,
an input terminal, and
a negative feedback terminal;
load means,
circuit impedance means connecting said output terminals to said load means,
means connecting said negative feedback terminal to be supplied by the signal at said load means,
means individually connected to said circuit impedance means and responsive to the polarity of the voltage across said circuit impedance means for indicating the presence or absence of the extreme signal at the input terminal of the associated amplifier.

2. A system according to claim 1 further including
voltage limiting means connected between said output terminal and said negative feedback terminal to limit the voltage difference between the signal at said negative feedback terminal and the signal at said output terminal,
said voltage limiting means being effective to limit said voltage difference only when the voltage at said output terminal is less than the voltage at said negative feedback terminal.

3. A system according to claim 1 wherein said circuit impedance means is a diode.

4. A system according to claim 2 wherein said circuit impedance means and said voltage limiting means are diodes.

5 A system according to claim 4 wherein
said means responsive to the polarity of the voltage across said circuit impedance (diode) means is a differential amplifier having its inputs connected to the anode and cathode electrodes of that diode.

6. A system according to claim 5 wherein
said differential amplifier provides an output signal indicating when the diode connected between the differential inputs is reverse biased.

7. A system for identifying the extreme value from among a plurality of input signals comprising,
a plurality of differential amplifiers each having
an inverting input terminal,
a noninverting input terminal, and
an output terminal;
load means,
diode means connecting said output terminals to said load means,
said diodes being polarized to permit current flow from said amplifiers to said load and to inhibit current flow in the reverse direction,
means connecting said inverting input terminal to be supplied by the signal at said load means,
means individually connected to said diode means and responsive to the polarity of the voltage across said diode means for indicating the presence or absence of the extreme signal at the noninverting input terminal of the associated amplifier.

8. A system according to claim 7 further including
voltage limiting means connected between said output terminal and said inverting input terminal to limit the voltage difference between the signal at said inverting input terminal and the signal at said output terminal,
said voltage limiting means being effective to limit said voltage difference only when the voltage at said output terminal is less than the voltage at said inverting input terminal.

9. A system according to claim 8 wherein said voltage limiting means is a diode polarized to permit current flow from said inverting input terminal to said output terminal and to inhibit current flow in the reverse direction.

10. A system according to claim 7 wherein
said means responsive to the polarity of the voltage across said diode means are differential amplifiers having their inputs connected to the anode and cathode electrodes of those diodes.